US00H002241H

(19) United States
(12) Statutory Invention Registration
Colbow et al.

(10) Reg. No.: US H2241 H
(43) Published: Jun. 1, 2010

(54) FUEL CELL ELECTRIC POWER GENERATING SYSTEM

(76) Inventors: Kevin M Colbow, 1175 Renton Place, West Vancouver, BC (CA), V7S 2K8; Rudolf J Coertze, 3078 Cardinal Court, Coquitlam, BC (CA), V3E 3C4; Andrew J Henderson, 1169 Esperanza Drive, Coquitlam, BC (CA), V3B 6A6; Bien H Chiem, 7281 11th Avenue, Burnaby, BC (CA), V3N 2M9; Robert H Artibise, #2303-1501 Haro Street, Vancouver, BC (CA), V6G 1G4; Seungsoo Jung, #206-228 East 18th Avenue, Vancouver, BC (CA), V5V 1E6

(21) Appl. No.: 11/003,635

(22) Filed: Dec. 3, 2004

(65) Prior Publication Data

US 2007/0148509 A1 Jun. 28, 2007

(51) Int. Cl.
*H01M 4/00* (2006.01)

(52) U.S. Cl. ..... 429/27; 429/12; 429/34; 429/35; 429/36

(58) Field of Classification Search ..... 429/27, 429/12, 34, 35, 36
See application file for complete search history.

*Primary Examiner*—M. Clement

(74) *Attorney, Agent, or Firm*—Seed IP Law Group PLLC

(57) ABSTRACT

A fuel cell electric power generation system using air as both a coolant and an oxidant comprises an electric power generation subsystem, an air filter subsystem, a power and control electronics unit (PEU) subsystem comprising a DC/DC converter, and an air fan subsystem. The subsystems are arranged such that air circulation through the system is improved and the risk of moisture damage to sensitive PEU components is reduced. In one embodiment, the air filter subsystem is positioned ahead of the PEU subsystem, which is positioned ahead of the power generation subsystem, which is positioned ahead of the air fan subsystem in the direction of air flow, such that air is drawn by the air fan subsystem through the air filter subsystem, over the PEU subsystem, and through the electric power generation subsystem providing filtered air to cool the PEU prior to entering the fuel cell stack to provide oxygen for the electrochemical reaction.

3 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUEL CELL ELECTRIC POWER GENERATING SYSTEM

BACKGROUND OF THE INVENTION

Field of the Invention

The invention relates to a fuel cell electric power generating system. More specifically, to a fuel cell system using air cooling.

Description of the Related Art

Fuel cells are electrochemical devices that generate power from a chemical reaction. Hydrogen and oxygen are typically the primary fuel and oxidant, respectively, involved in the reaction. The reaction takes place at a membrane electrode assembly (MEA). The MEA has an anode and a cathode electrode and a membrane electrolyte for letting protons pass through. An additional product of the reaction is heat. Fuel cells have a load-dependent electrical efficiency of about 50%. The heat losses must be carried off by a corresponding cooling system. In most cases this is accomplished by means of water circulation with an external cooler. Air-cooled cells or stacks are also known. Air-cooled systems, where the air serves both as a coolant and as an oxidant, are especially advantageous because they can be designed more cheaply by not requiring separate systems for coolant and oxidant supply. An example of a fuel cell for use in such an ambient air and coolant system is described in Magnet Motor reference WO98/39809. This reference also discloses the use of an additional gas diffusion barrier (GDB) layer as part of the gas diffusion electrodes. The GDB layer prevents the drying out of the fuel cell membranes that would otherwise occur under continuous operation. However, air that is moved away from the reaction sites of these systems can still pick up some of the water involved in the chemical process and experience an increase in moisture content as it cools the system. The architectural layouts of fuel cell systems of the prior art have consisted of moving air throughout the system in a manner that increases the risk that moist air will cause damage to the sensitive components such as the power and control electronics unit (PEU) or that air heated by the fuel cell stack will not sufficiently cool the PEU and thus increase the risk of premature failure of the PEU.

Accordingly, there remains a need for a fuel cell system where air is moved throughout the air cooled system while reducing the risk of moisture damage to the PEU and also preventing the fuel cell stack from heating the air prior to it cooling the PEU.

BRIEF SUMMARY OF THE INVENTION

A fuel cell electric power generation system using air as both a coolant and an oxidant comprises an electric power generation subsystem, an air filter subsystem, a power electronics unit (PEU) subsystem comprising a DC/DC converter, and an air fan subsystem. The subsystems are arranged such that air circulation through the system is improved and the risk of moisture damage to sensitive PEU components is reduced. In one embodiment, the air filter subsystem is positioned ahead of the PEU subsystem, which is positioned ahead of the power generation subsystem, which is positioned ahead of the air fan subsystem in the direction of air flow, such that air is drawn by the air fan subsystem through the air filter subsystem, over the PEU subsystem, and through the electric power generation subsystem, providing filtered air to cool the PEU prior to entering the fuel cell stack to provide oxygen for the electrochemical reaction.

BRIEF DESCRIPTION OF THE DRAWINGS

The provided FIGURES illustrate certain non-optimized aspects of the invention, but should not be construed as limiting in any way.

DETAILED DESCRIPTION OF THE INVENTION

Figure 1A:
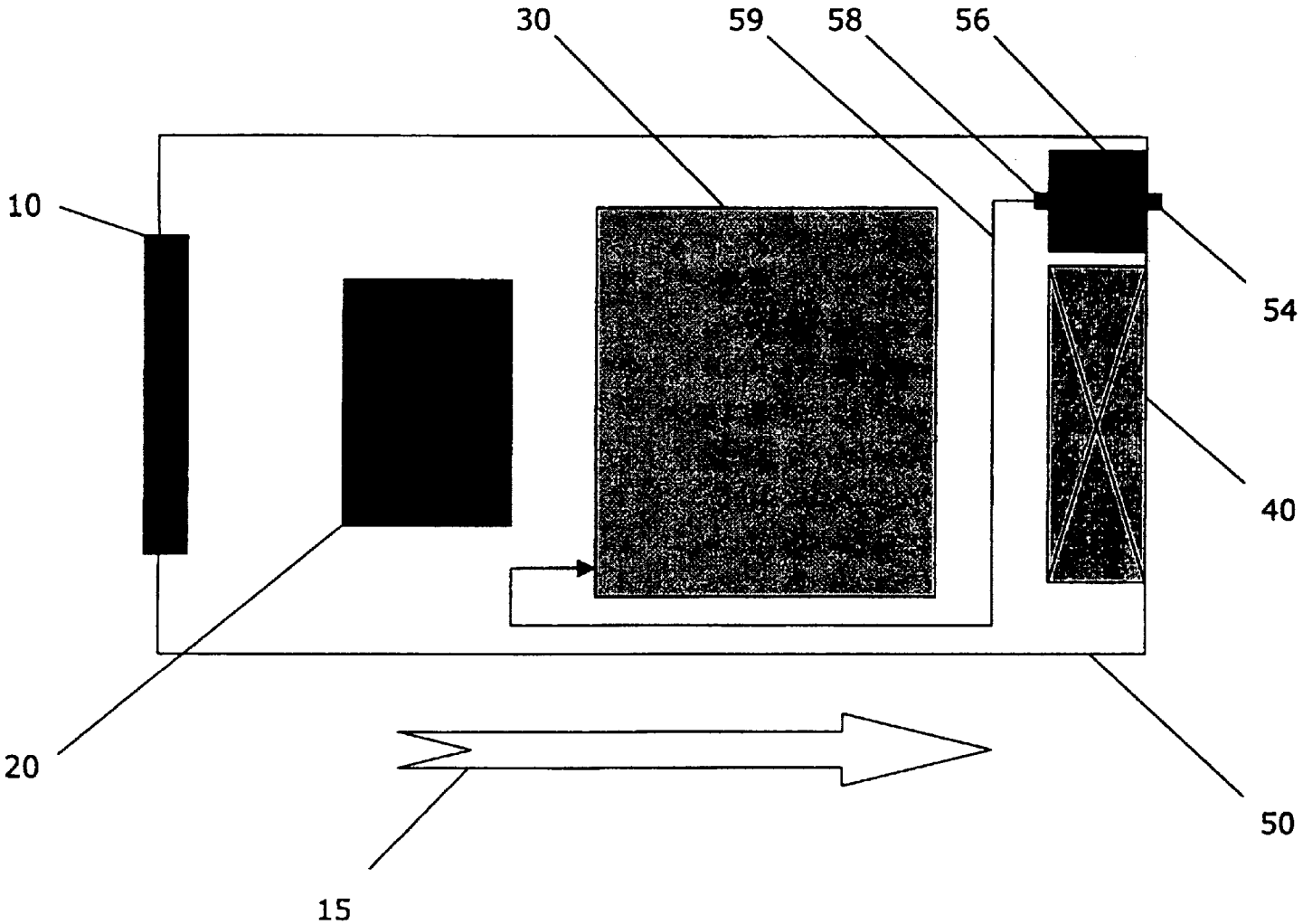
FIG. 1*a* is a schematic view showing the overall system architecture of an electrochemical fuel cell power generation system employing ambient air as the oxidant and coolant.

As illustrated in FIG. 1*a*, an ambient air and oxidant cooling system consists of an air filter (10), a power electronics unit (PEU) (20), a fuel cell stack (30), a fuel supply system (56), and a fan (40). Although only a single air filter or fan is depicted, configurations with more than one air filter or fan can also be envisioned. Also, the fan can be provided with a tachometer that can serve as both a fan speed measurement device or as a system on/off indicator.

The PEU of the ambient air and oxidant cooling system depicted in FIG. 1*a* comprises a power supply with a DC/DC converter that can have an architecture and a power conversion methodology as shown in patent application US20040217732. The power supply comprises a main power converter architecture that allows the fuel cell stack to operate independently of a desired output voltage. The fuel cell stack may be directly connected to the main power converter eliminating high current switches and diodes. Switches are operable to selectively power an auxiliary component such as the cooling fan to the fuel cell stack or to a storage device via an auxiliary power A single auxiliary power converter can replace a dedicated cooling fan power supply. Also, the power supply can operate in a variety of states.

Figure 1B:
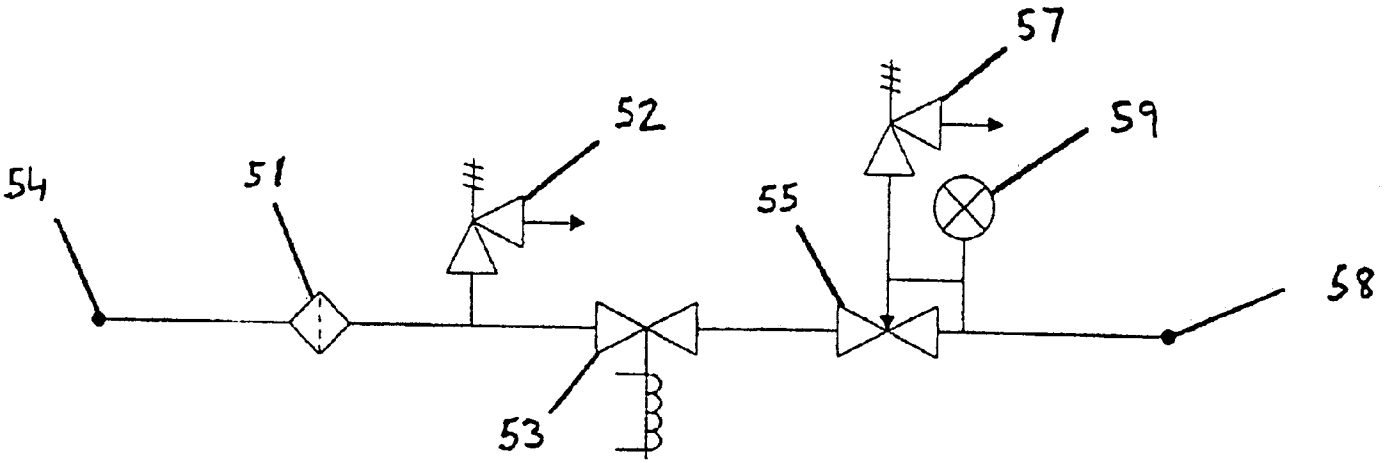
FIG. 1*b* is a component diagram of a fuel supply system of an electrochemical fuel cell power generation system employing ambient air as the oxidant and coolant.

The ambient air and oxidant cooling system of FIG. 1*a* further comprises a fuel supply system (56), depicted in more detail in FIG. 1*b*. Fuel is brought into the fuel supply system at fuel system inlet port (54) and filtered through sintered filter (51). A pressure relief valve (52) is provided on the high pressure side of solenoid valve (53) to guard against overpressure situations above about 240 kPa. When the solenoid valve is activated by a controller, the fuel proceeds through a pressure regulator (55) before exiting through fuel system outlet port (58) to the fuel cell stack via fuel supply line (59). The low pressure side of the regulator also is equipped with a pressure relief valve (57) set to be operable at pressures over about 0.5 kPa. The pressure regulator can be advantageously controlled with a photoswitch (59) that is less costly than comparable mechanical pressure transducers.

In one embodiment of the present invention, as shown in FIG. 1*a*, the air filter (10) is positioned ahead of the PEU (20) which is ahead of the fuel cell stack (30) which is ahead of the fan (40) in the direction of air flow (15). All the components are contained in a housing (50). This arrangement allows for filtered air, free of airborne particulates, SOx, NOx and chemical contaminants, to cool the PEU. Also, the air is neither heated nor moistened from the exhaust of the fuel cell stack before it reaches the PEU and thus the risk of damage to the PEU is reduced. Because the fan is sucking air through the electricity generating system, the air is thought to flow in a more laminar fashion than if it were blown through and cooling is also optimized in this fashion. This arrangement also permits a more aesthetically pleasing final system configuration because the fan can be mounted in the rear of the unit where it is not as visible.

Figure 2:
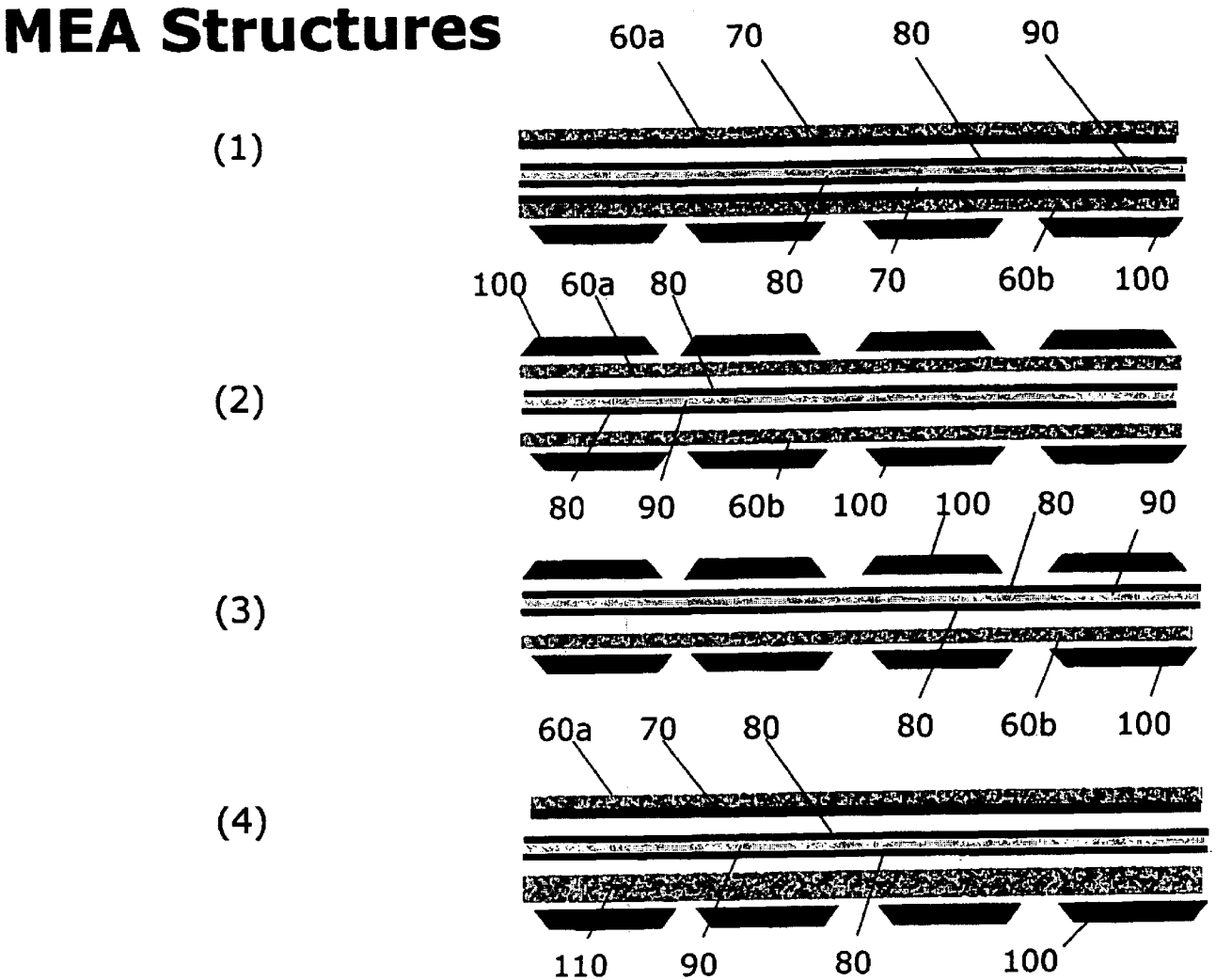
FIG. 2 is a section view of various MEA structure construction details suitable for use in an electrochemical fuel cell power generation system employing ambient air as the oxidant and coolant.

The ambient air and oxidant cooling system of FIG. 1*a* further comprises a fuel cell stack (30) that can have MEA constructions as illustrated in FIG. 2. As shown in a first embodiment in FIG. 2(l), the MEA can be constructed from a 1-layer anode comprising a gas diffusion layer (GDL) with a porous base substrate (60*a*) and a smoothed carbon sublayer (70), a catalyst coated membrane comprising a membrane (90) and catalyst layers (80), and a 2 layer cathode comprising a GDL with a porous base substrate (60*b*) and a smoothed carbon sublayer (70) and a gas diffusion barrier (GDB) (100). In another embodiment as shown in FIG. 2(2), the MEA can be constructed from a 2-layer anode comprising a GDB (100) and a GDL with a porous base substrate (60 i a), a catalyst-coated membrane (CCM) comprising a membrane (90) and catalyst layers (80), and a 2-layer cathode comprising a GDB (100) and a GDL with a porous base substrate (60*b*). In a further embodiment as shown in FIG. 2(3), the MEA can be constructed from a 1-layer anode comprising a GDB (100), a CCM comprising a membrane (90) and catalyst layers (80), and a 2-layer cathode comprising a GDL with a porous base substrate (60b) and a GDB (100). In yet another embodiment as shown in FIG. 2(4), the MEA can be constructed from a 1-layer anode comprising a GDL with a porous base substrate (60*a*) and a smoothed carbon sublayer (70), a CCM comprising a membrane (90) and catalyst coats (80), and a 2-layer cathode comprising a GDL with a thick porous base substrate (110) and a GDB (100). The thicker porous base substrate (110) provides better diffusion to the landings of the fuel cell, yet maintains a good barrier.

Various fuel cells according to the embodiments of the MEA structures depicted in FIG. 2 were built and tested to determine both the cell voltages that can be achieved with these structures and the operating temperatures at which they can be achieved. Table 1 provides results for achieved cell voltage at a load of 350 mA/cm$^2$ and the corresponding recorded optimum operating temperature (Topt) for various specific material combinations based on the example structures of FIG. 2. All data was obtained using the identical test protocol. The cells were conditioned at 530 m A/cm$^2$ for at least 36 hours with air starvations in between load ramps to accelerate conditioning. The air stoichiometry ratio during test was set to 100 while the fuel stoichiometry ratio was set at 1.2. The stoichiometry ratio for the gases fed to the fuel cell is defined as the ratio of the feed rate to the consumption rate. A stoichiometry ratio of 1.0, for example, implies that there is no exit stream flow rate of the reactant. Also, the cells were operated at the open circuit voltage (OCV) point to oxidize contaminants.

Table 1 discloses various examples of GDBs, CCMs, and GDLs that can be used in the MEA structures of FIG. 2. For example, two different types of GDBs are shown in Table 1. Types 5.5' and 12' refer, respectively, to two different types of proprietary exfoliated graphite. As another example, two different types of CCMs are disclosed. Types 5700' and 5800' refer, respectively, to different proprietary membrane series. Series 5700 is an 18 μm CCM and was platinum loaded at 0.1/0.4 mg Pt/cm$^2$ on the anode and cathode sides respectively. Series 5800 is an 18 μm CCM and was platinum loaded at 0.1/0.3 mg Pt/cm$^2$. As another example, five different types of GDL are disclosed; types 'A', 'B', 'C', 'D', and 'E'. Type 'A' comprises Ballard Material Products (BMP) substrate P75T-13 with 13% PTFE (polytetrafluoroethylene) and a calendered sublayer of 80 g/m$^2$ KS15/Shawinigan carbon in a ratio of 95/5 with 50% PTFE. Type 'B' comprises BMP substrate P50T-33 with 33% PTFE. Type 'C' comprises BMP substrate P50T-24 with 24% PTFE and a calendered sublayer of 50 g/m$^2$ KS15/Shawinigan carbon in a ratio of 95/5 with 18% PTFE. Type 'D' comprises BMP substrate P50T-33 with 33% PTFE, a 1$^{st}$ not calendered sublayer coat of 20 g/m$^2$ KS75/Shawinigan carbon in a ratio of 95/5 with 18% PTFE, and a 2$^{nd}$ calendered sublayer coat of 30 g/m$^2$ KS15/Shawinigan carbon in a ratio of 95/5 with 18% PTFE. Type 'E' comprises BMP substrate P75T-13 with 13% PTFE and a calendered sublayer of 20 g/m$^2$ KS15/Shawinigan carbon in a ratio of 95/5 with 50% PTFE.

| MEA Structure (from | Anode | | | Cathode | | Cell voltage at 350 mA/cm$^2$ | Topt at 350 mA/cm$^2$ |
|---|---|---|---|---|---|---|---|
| FIG. 2) | GBD | GDL | CCM | GDL | GDB | (mV) | (° C.) |
| 1 | None | A | 5700 | D | 5.5 | 696 | 58 |
| | | | | | | 671 | 60 |
| 2 | 12 | B | 5800 | B | 5.5 | 643 | 65 |
| 2 | 5.5 | B | 5700 | B | 5.5 | 678 | 60 |
| | | | | | | 660 | 65 |
| | | | | | | 673 | 60 |
| 2/4 | 5.5 | C | 5700 | E | 5.5 | 665 | 63 |
| 3 | 5.5 | None | 5700 | B | 5.5 | 647 | 60 |
| 4 | None | A | 5700 | E | 5.5 | 678 | 62 |
| | | | | | | 695 | 60 |
| | | | | | | 679 | 60 |

MEAS built with structures as shown in FIG. 2, for example, must be sealed to prevent the fuel used in the chemical reaction from escaping the fuel cell stack.

Figure 3A:
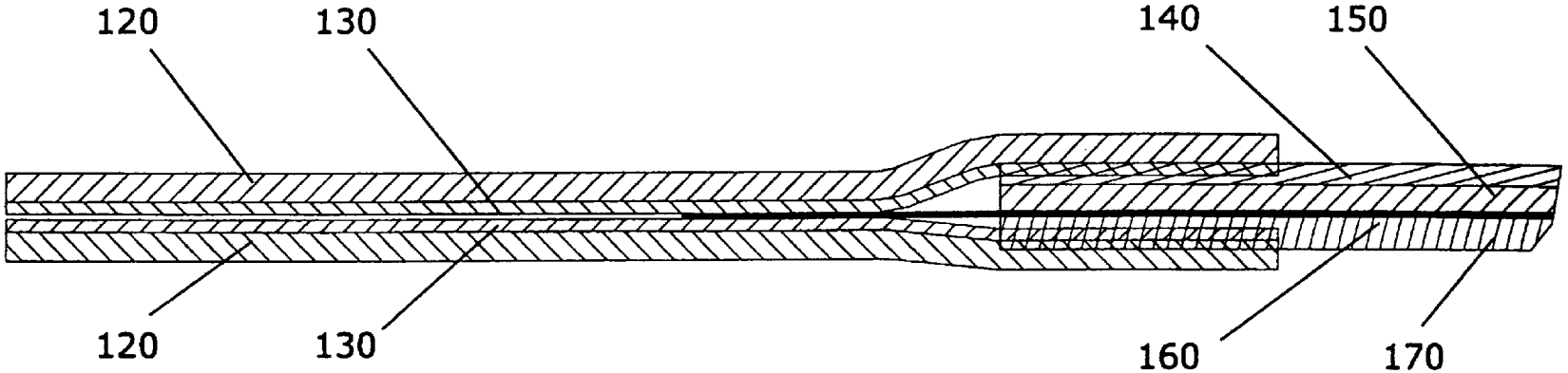
FIGS. 3A and 3B illustrate alternative embodiments of a MEA seal design for use in an electrochemical fuel cell power generation system employing ambient air as the oxidant and coolant.
Figure 4A:
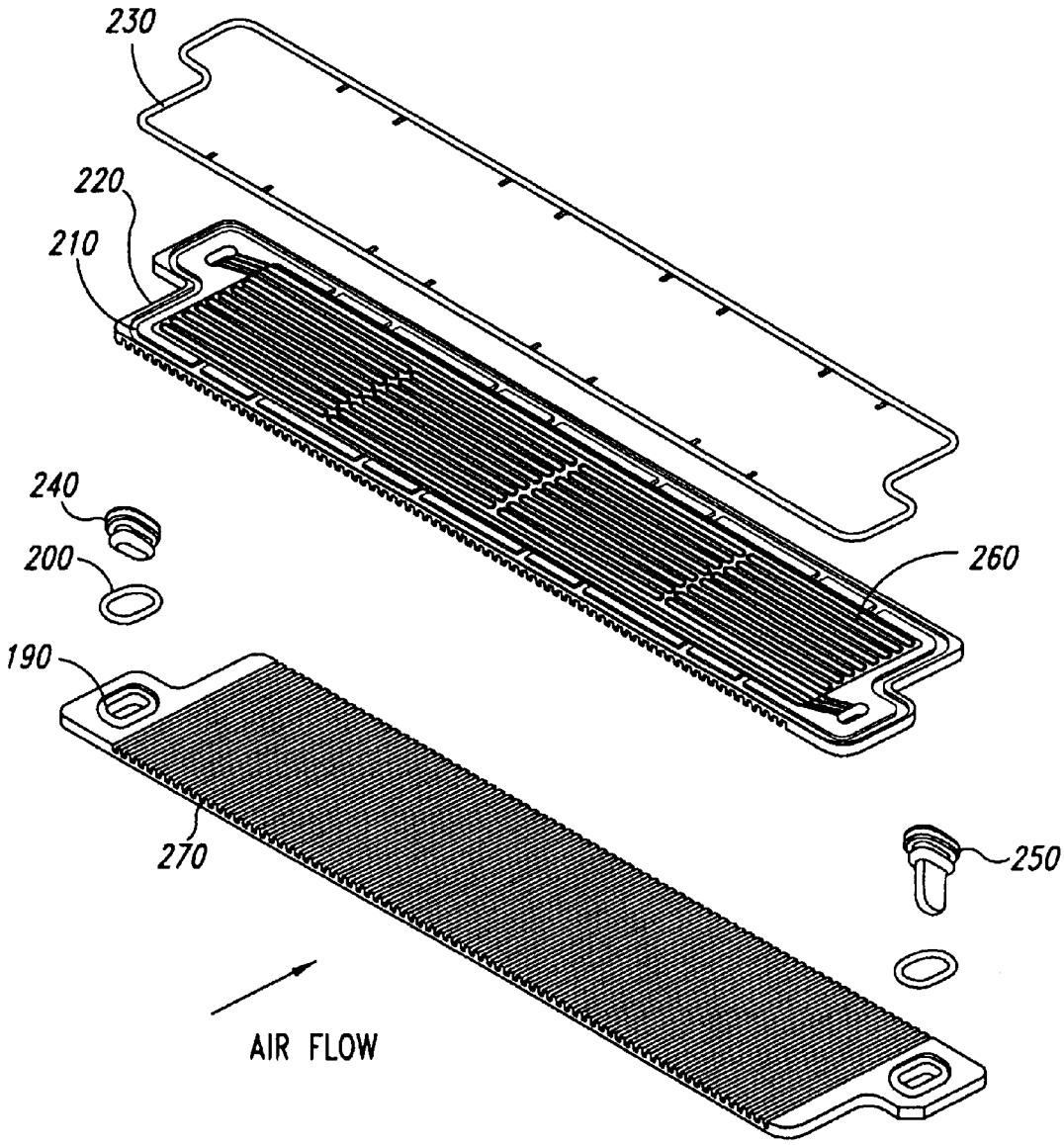
FIGS. 4A and 4B illustrate alternative embodiments of a plate design for use in an electrochemical fuel cell power generation system employing ambient air as the oxidant and coolant.

The MEAs must be sealed both along their edges and also sealed with respect to the anode/fuel side of their adjacent separator plates. In one embodiment, a seal design between an MEA, as illustrated in FIG. 3A, and a plate as illustrated in FIG. 4A is disclosed. In FIG. 3A, the MEA comprises a CCM (160), a cathode GDB (140), a cathode GDL (150), and an anode GDL (170). The MEA is sealed along its edge with a bridge seal (120) and an adhesive layer (l30). In FIG. 4A, two views of a plate assembly suitable for sealing with the MEA of FIG. 3A are shown; the isometric exploded bottom view of the cathode/air side and the isometric exploded top view of the anode/fuel side. The anode/fuel side of the fuel cell plate assembly (220) has serpentine fuel flow channels (260) and is sealed against the bridge seal of the adjacent MEA with perimeter seal (230) which rests in seal groove (210). The cathode/air side of the plate assembly has air flow channels (270) that are perpendicular to the fuel flow channels (260) and are open to the air flow on both ends of the plate. The ports of the plate on each end can be sealed with port seals (200) which rest within port seal grooves (190). In a further embodiment, the port seals (200) can be replaced with either port plugs (240) or port plugs with tabs (250) to advantageously adapt the plate assemblies to the ends of the fuel cell stack where ports are not required such that two different types of plates are not needed.

Figure 3B:
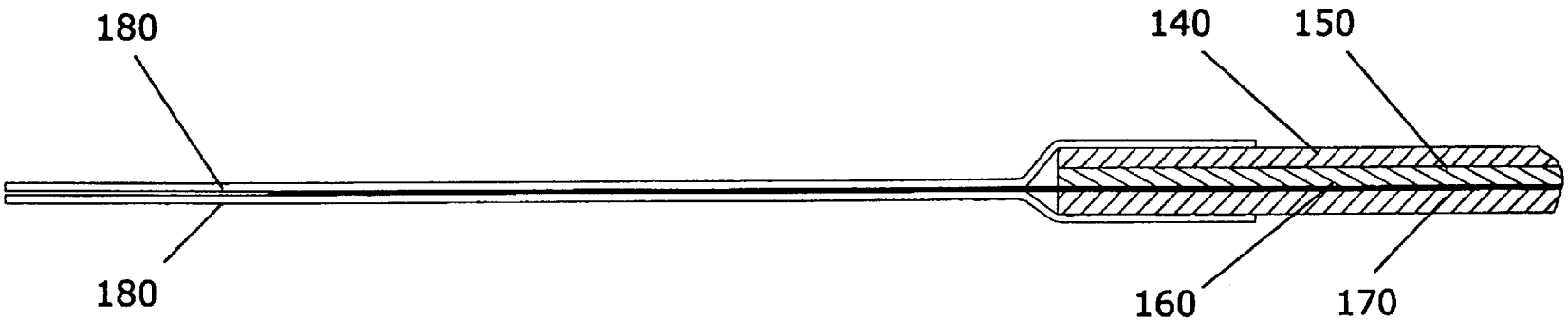
Figure 4B:
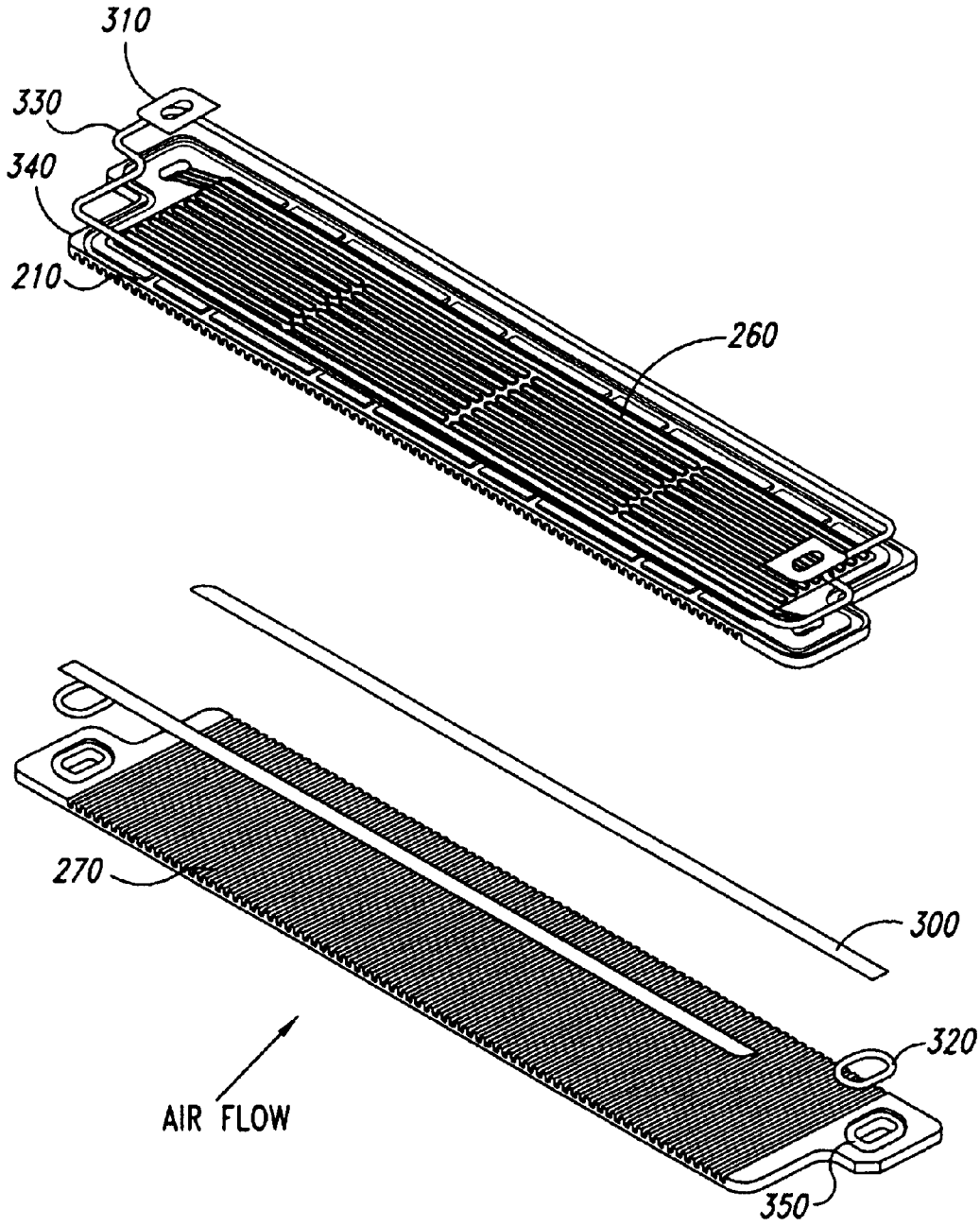

In yet another embodiment, a seal design between an MEA, as illustrated in FIG. 3B, and a plate as illustrated in FIG. 4B is disclosed. In FIG. 3B, the MEA comprises a CCM (160), a cathode GDB (140), a cathode GDL (150), and an anode GDL (170), The MEA is sealed along its edge with an encapsulation layer (180), In FIG. 4B, two views of a plate assembly suitable for sealing with the MEA of FIG. 3B are shown; the isometric exploded bottom view of the cathode/air side and the isometric exploded top view of the anode/fuel side. The anode/fuel side of the fuel cell plate assembly (340) has short, straight serpentine fuel flow channels (260) and is sealed against the adjacent MEA encapsulation layer with perimeter seal (330) which rests in seal groove (210). The cathode/air side of the plates comprises bridges (300) that seat against the MEA encapsulation layer on the opposite side of the perimeter seal (330) which allows the seal to span the air channels of the plate. The port ends of the anode/fuel side are covered by port bridges (310) which allow the ports of the plate on each end to be sealed with port seals (320) which rest within port seal grooves (350). The cathode/air side of the plate assembly also has air flow channels (270) that are perpendicular to the fuel flow channels (260).

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A fuel cell electric power generating system comprising:

at least one air filter;

a power and control electronics unit (PEU);

a fuel cell stack comprising one or more fuel cells; and at least one fan configured to suck air through the filter, around the PEU and through the fuel cell stack, said air filter disposed ahead of the PEU, said PEU disposed ahead of the fuel cell stack in the direction of air flow.

2. The system of claim 1, wherein the fuel cells in the stack comprise plates and the plates comprise port plugs to make them adaptable as end plates.

3. The system of claim l, wherein the fuel cells in the stack comprise membrane electrode assemblies (MEAs) and the MEAs comprise edges sealed with bridge seals and adhesive layers, and the fuel cells also comprise plates and the plates comprise perimeter seals sealed against the bridge seals of the MEAs.

* * * * *